(12) United States Patent
Iwasaki (10) Patent No.: US 10,122,941 B2
(45) Date of Patent: *Nov. 6, 2018

(54) IMAGE PICKUP APPARATUS, METHOD FOR CONTROLLING THE IMAGE PICKUP APPARATUS, AND RECORDING MEDIUM

(71) Applicant: CANON KABUSHIKI KAISHA, Tokyo (JP)

(72) Inventor: Takahiro Iwasaki, Kiyose (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,098

(22) Filed: Nov. 14, 2016

(65) Prior Publication Data
US 2017/0064216 A1    Mar. 2, 2017

Related U.S. Application Data

(63) Continuation of application No. 14/065,143, filed on Oct. 28, 2013, now Pat. No. 9,525,826, which is a continuation of application No. PCT/JP2013/063244, filed on May 13, 2013.

(30) Foreign Application Priority Data

May 21, 2012    (JP) ................. 2012-115762

(51) Int. Cl.
*H04N 5/232* (2006.01)
*H04N 5/262* (2006.01)
*H04N 7/18* (2006.01)
*G08B 13/196* (2006.01)

(52) U.S. Cl.
CPC ..... *H04N 5/2621* (2013.01); *G08B 13/19686* (2013.01); *H04N 5/23206* (2013.01); *H04N 7/18* (2013.01)

(58) Field of Classification Search
CPC .................................................... H04N 5/232
USPC .................................................... 348/211.99
See application file for complete search history.

(56) References Cited

U.S. PATENT DOCUMENTS

| 5,615,324 A * | 3/1997 | Kuboyama ......... G06F 17/3025 345/441 |
| 6,727,938 B1 * | 4/2004 | Randall ............ G08B 13/19602 348/143 |
| 2003/0227555 A1 * | 12/2003 | Kobayashi ......... G08B 13/1963 348/231.6 |

* cited by examiner

*Primary Examiner* — Anthony J Daniels
(74) *Attorney, Agent, or Firm* — Canon USA, Inc. I.P. Division (57) ABSTRACT

An image pickup apparatus includes a receiving unit configured to receive a designation of an image pickup direction of an image pickup unit in relation to superimposition of a mask image on an picked-up image; and a setting unit configured to set, when the receiving unit receives the designation of the image pickup direction, a position of superimposition of the mask image in an image pickup range where the image pickup unit can pick up images, on the basis of the designated image pickup direction.

9 Claims, 9 Drawing Sheets

IMAGE PICKUP APPARATUS, METHOD FOR CONTROLLING THE IMAGE PICKUP APPARATUS, AND RECORDING MEDIUM

CROSS-REFERENCE TO RELATED APPLICATIONS

This application is a continuation, and claims the benefit, of U.S. patent application Ser. No. 14/065,143, presently pending and filed on Oct. 28, 2013, which is a Continuation of International Patent Application No. PCT/JP2013/063244, filed May 13, 2013, which claims the benefit of Japanese Patent Application No. 2012-115762, filed May 21, 2012, all of which are hereby incorporated by reference herein in their entirety.

TECHNICAL FIELD

The present invention relates to an image pickup apparatus capable of delivering a picked-up image, and particularly relates to the function of superimposing a mask image on a picked-up image picked up by the image pickup apparatus.

BACKGROUND ART

Conventionally, a mask processing function has been provided, which is for preventing a specific area of a picked-up image from being identified by a delivery destination of a picked-up image. Examples of the mask processing function include the function of filling in a target area in an on-screen display (OSD), the function of lowering the image quality of a target area, and the function of filtering.

For example, Patent Literature (PTL) 1 discloses a technique which involves lowering the image quality of a capturing prohibited area in image data output from an image pickup unit.

A camera described in PTL 1 is connected via a network to a recording device. The recording device designates a capturing prohibited position in a picked-up image input from the camera. The camera sets a capturing prohibited area at the position designated by the recording device.

CITATION LIST

Patent Literature

PTL 1 Japanese Patent Laid-Open No. 2005-323007

The implementation and interface of a mask processing function varies depending on the camera and the client application.

In a conventional method, a mask position is identified using a coordinate system shared by a camera and a client. In this case, the client needs to replace mask position information input by a user or the like with a coordinate value in the coordinate system shared by the camera and the client, and then to transmit the coordinate value to the camera. Also, to configure the mask setting for a plurality of cameras having different coordinate systems, the client needs to designate a coordinate position of a mask image in accordance with the coordinate system of each camera. This makes the processing in the client complicated.

SUMMARY OF INVENTION

To solve the problems described above, an image pickup apparatus according to the present invention includes an image pickup unit capable of changing an image pickup direction; a transmitting unit configured to transmit a picked-up image picked up by the image pickup unit to a receiving device; a receiving unit configured to receive a designation of the image pickup direction of the image pickup unit in relation to superimposition of a mask image on the picked-up image; and a setting unit configured to set, when the receiving unit receives the designation of the image pickup direction, a position of superimposition of the mask image in an image pickup range where the image pickup unit can pick up images, on the basis of the designated image pickup direction.

Further features of the present invention will become apparent from the following description of exemplary embodiments with reference to the attached drawings.

DESCRIPTION OF EMBODIMENTS

Embodiments of the present invention will now be described.

First Embodiment

Figure 1A:
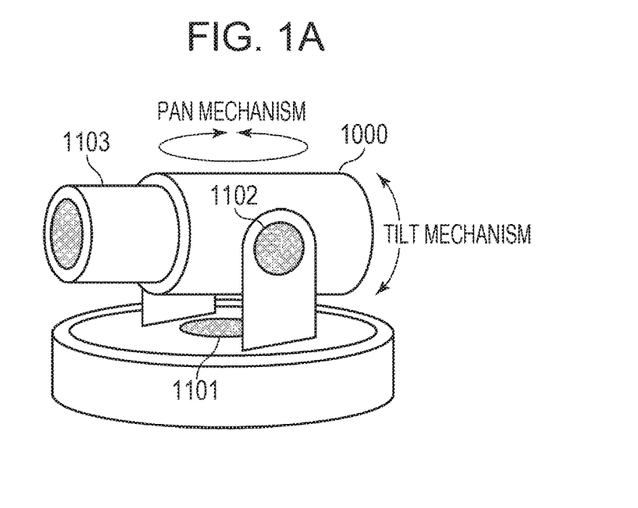
FIGS. 1A to 1C are external views of a system.

FIG. 1A illustrates a surveillance camera according to an embodiment of the present invention. Reference numeral 1101 denotes a mechanism that moves an image pickup unit in a pan direction, reference numeral 1102 denotes a mechanism that moves the image pickup unit in a tilt direction, and reference numeral 1103 denotes a zoom mechanism.

Figure 1B:
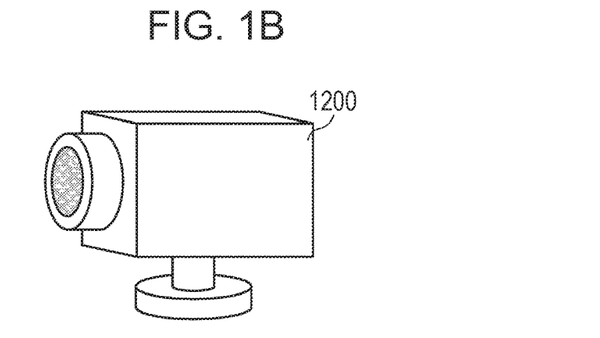
Figure 1C:
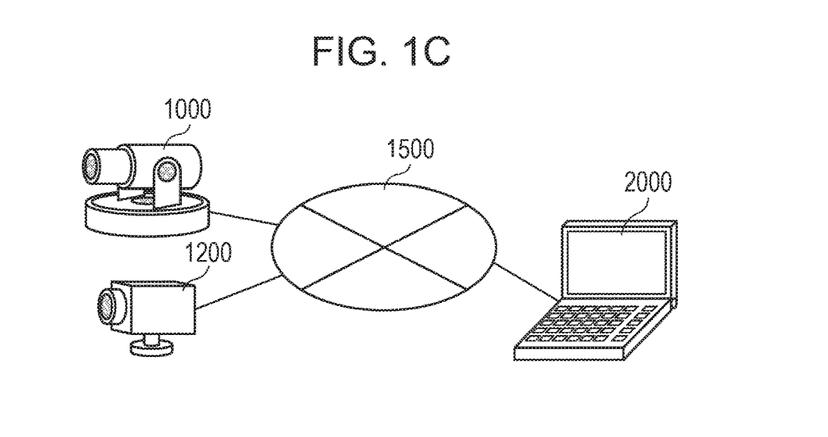

FIG. 1C illustrates a system configuration including a surveillance camera 1000. Reference numeral 2000 denotes a client device serving as an external device in the present invention. The surveillance camera 1000 and the client device 2000 are connected to be able to communicate with each other via an IP network 1500. The client device 2000 transmits, to the surveillance camera 1000, various commands (described below) for changing image pickup parameters, driving a camera platform, and starting video streaming. The surveillance camera 1000 transmits responses to the commands and video streaming to the client device 2000. The description of FIG. 1B will be given later on.

Figure 2A:
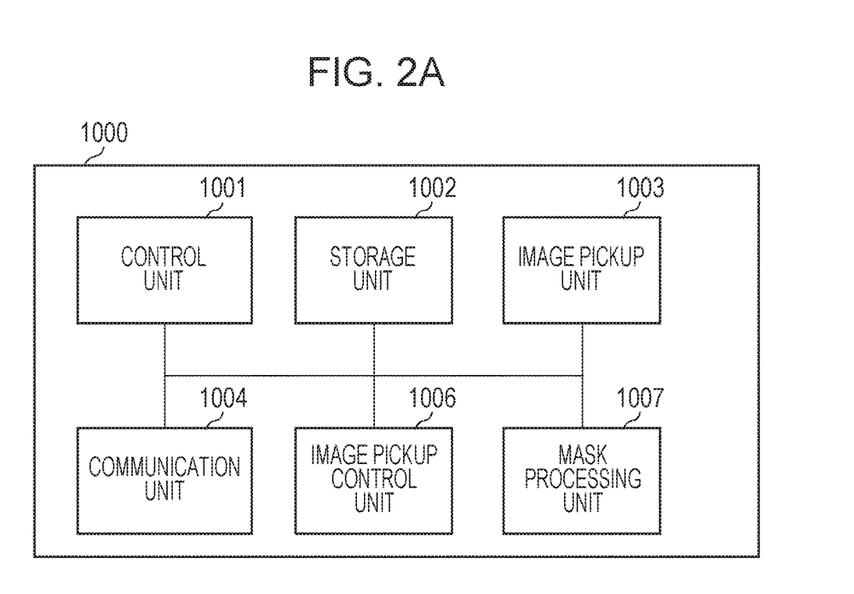
FIGS. 2A and 2B are block diagrams.

FIG. 2A illustrates an internal configuration of the surveillance camera according to the present embodiment.

In FIG. 2A, reference numeral 1001 denotes a control unit that controls an overall operation of the surveillance camera 1000. For example, the control unit 1001 is a computer formed by a CPU.

Reference numeral 1002 denotes a storage unit (memory). The storage unit 1002 is primarily used as a storage area for storing various types of data. For example, the storage unit 1002 is used as a storage area for storing programs executed by the control unit 1001, a work area for program execution, or a storage area for storing image data generated by an image pickup unit 1003 (described below).

Reference numeral 1003 denotes an image pickup unit. The image pickup unit 1003 converts an analog signal acquired by capturing an image of an object into digital data, compresses the data using adaptive discrete cosine transformation (ADCT) or the like to generate image data of a picked-up image, and outputs the picked-up image to the storage unit 1002. After outputting the picked-up image to the storage unit 1002, the image pickup unit 1003 issues an image acquisition event to the control unit 1001. An image pickup direction of the image pickup unit 1003 can be changed by an image pickup control unit 1006 (described below).

Reference numeral 1004 denotes a communication unit. The communication unit 1004 is used to receive various control commands from an external device, and to transmit a response to each control command to the external device (client device). The received commands include, for example, a designation of the image pickup direction of the image pickup unit 1003 in relation to superimposition of a mask image on a picked-up image. The communication unit 1004 transmits, as a delivery image, a part of or the entire picked-up image picked up by the image pickup unit 1003 to a receiving device (client device).

Reference numeral 1006 denotes an image pickup control unit. The image pickup control unit 1006 is used to control the pan mechanism 1101, the tilt mechanism 1102, and the zoom mechanism 1103 in accordance with values of a pan angle, a tilt angle, and a zoom factor input from the control unit 1001. That is, the image pickup control unit 1006 can change the image pickup direction of the image pickup unit 1003. In response to a query from the control unit 1001, the image pickup control unit 1006 supplies the current pan angle value, tilt angle value, and zoom factor value to the control unit 1001. Also, the image pickup control unit 1006 identifies the current image pickup direction of the image pickup unit 1003.

Reference numeral 1007 denotes a mask processing unit. The mask processing unit 1007 applies a mask to an appropriate position in image data output by the image pickup unit 1003. This mask processing is based on a pan angle, a tilt angle, and a zoom factor input by the control unit 1001 to identify a mask position. Additionally, this mask processing is based on an image cutout position in an image pickup range of the image pickup unit 1003 in the pan, tilt, and zoom conditions, and the designation of the size and position of the mask at the image cutout position. The mask processing unit 1007 has an effective flag for each mask. When the flag is False, the mask processing unit 1007 performs control not to output the mask.

An internal configuration of the surveillance camera 1000 has been described with reference to FIG. 2A. However, the processing blocks in FIG. 2A merely illustrate an example of a preferred embodiment of the surveillance camera according to the present invention. For example, the surveillance camera may include an audio input unit. That is, various changes and modifications may be made within the scope of the present invention. The description of FIG. 2B will be given later on.

The names and contents of commands and parameters used in the present embodiment will now be described.

Figure 3:
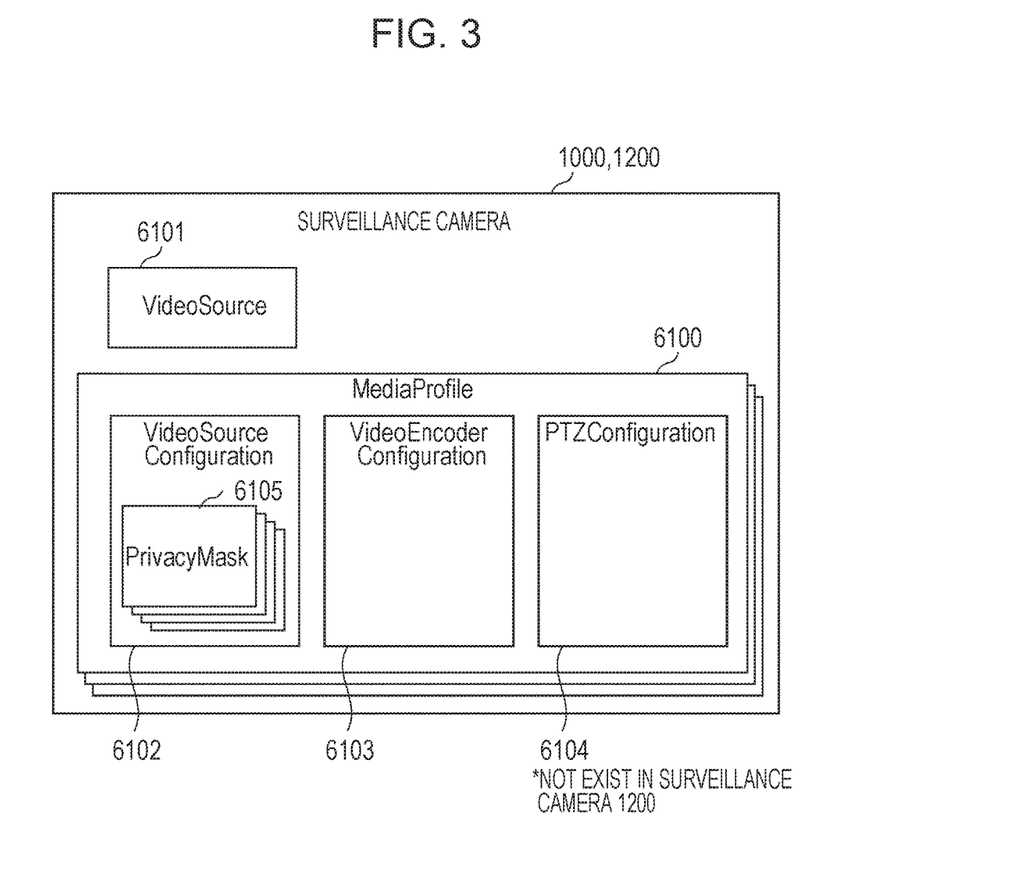
FIG. 3 illustrates a parameter configuration.

FIG. 3 illustrates a structure of parameters held in the storage unit 1002 by the surveillance camera 1000 of the present embodiment.

A MediaProfile 6100 is a parameter set for associating and storing various setting items of the surveillance camera. The MediaProfile 6100 holds a ProfileToken which is ID of the MediaProfile 6100. Additionally, the MediaProfile 6100 holds a VideoSourceConfiguration 6102, a VideoEncoderConfiguration 6103, and a PTZConfiguration 6104. The MediaProfile 6100 also holds links to various setting items including a delivery image encoder and an audio encoder.

A VideoSource 6101 is a group of parameters indicating performance of an image pickup sensor of the surveillance camera. The VideoSource 6101 includes a VideoSourceToken which is ID of the VideoSource 6101, and a Resolution indicating a resolution of image data that can be output by the image pickup sensor. The Resolution includes a Height and a Width that express a height and a width, respectively, in pixels.

The VideoSourceConfiguration 6102 is a group of parameters that associate the VideoSource 6101 with the MediaProfile 6100 of the surveillance camera. The storage unit 1002 holds a plurality of video source configurations, each including a resolution of a picked-up image and used to generate the picked-up image. The VideoSourceConfiguration 6102 includes a VideoSourceConfigurationToken which is ID of the VideoSourceConfiguration 6102. The VideoSourceConfigurationToken is identification information for identifying a video source configuration. The VideoSourceConfiguration 6102 includes Bounds for designating which part of image data output from the VideoSource 6101 is to be cut out and used as a delivery image. The Bounds include a Height and a Width that express a height and a width, respectively, of the delivery image to be cut out of the image data in pixels; and x and y that express coordinates of a lower-left point of the delivery image to be cut out in pixels, with an upper-left point of the image data as the origin. Delivery image position information (position of the Bounds) indicating the position of the delivery image in the picked-up image is associated with identification information (VideoSourceConfigurationToken) for identifying the delivery image position information, and a plurality of sets of this associated information are stored. Thus, the storage unit 1002 holds a plurality of video source configurations, each including a reference to a configuration of a resolution of a picked-up image and a reference to a configuration of a cutout position for cutting out a delivery image to be transmitted to the receiving device from the picked-up image having the resolution.

The VideoEncoderConfiguration 6103 is a group of parameters that associate a configuration related to video compression with the MediaProfile 6100. The surveillance camera 1000 delivers image data which is output on the basis of the contents of the VideoSourceConfiguration 6102 to the client device 2000. This delivery is according to a video compression technique (e.g., JPEG or H.264), a frame rate, or a parameter such as a resolution, set in the VideoEncoderConfiguration 6103.

The PTZConfiguration 6104 is a group of parameters that associate a configuration related to the pan mechanism 1101, the tilt mechanism 1102, and the zoom mechanism 1103 of the surveillance camera 1000 with the MediaProfile 6100. The PTZConfiguration 6104 includes information about a coordinate system that expresses actual pan and tilt angle values and a zoom factor value in the pan mechanism, the tilt mechanism, and the zoom mechanism. In the present example, the coordinate system includes angle coordinates having a pan range $x=-180$ to $+180$ (degrees) and a tilt range $y=-90$ to $+90$ (degrees), and a magnification coordinate having a zoom $z=1$ to $100$ (times).

A PrivacyMask 6105 is a group of parameters that hold a list of parameters related to a mask. The PrivacyMask 6105 includes a PrivacyMaskToken which is ID of the PrivacyMask 6105, a Name which is a name of a PrivacyMask structure, and a Mask that designates the position and size of the mask using a polygon with three or more points. The PrivacyMask 6105 further includes an Enabled which is a flag that designates whether to display the mask on a delivery image, a Color that designates the color of the mask, and a PTZDesignation that identifies the position of the camera platform.

The PTZDesignation includes a PTZConfigurationToken that designates the PTZConfiguration 6104 including a definition of a coordinate system for expressing the orientation (pan and tilt) of the camera platform and the zoom factor. The PTZDesignation further includes a Position that designates the orientation of the camera platform and the zoom factor in the coordinate system indicated by the designated PTZConfiguration. The Position includes the orientation of the image pickup unit 1003, that is, coordinates of the center point of image data output by the image pickup unit and a numerical value of the zoom factor.

Figure 4:
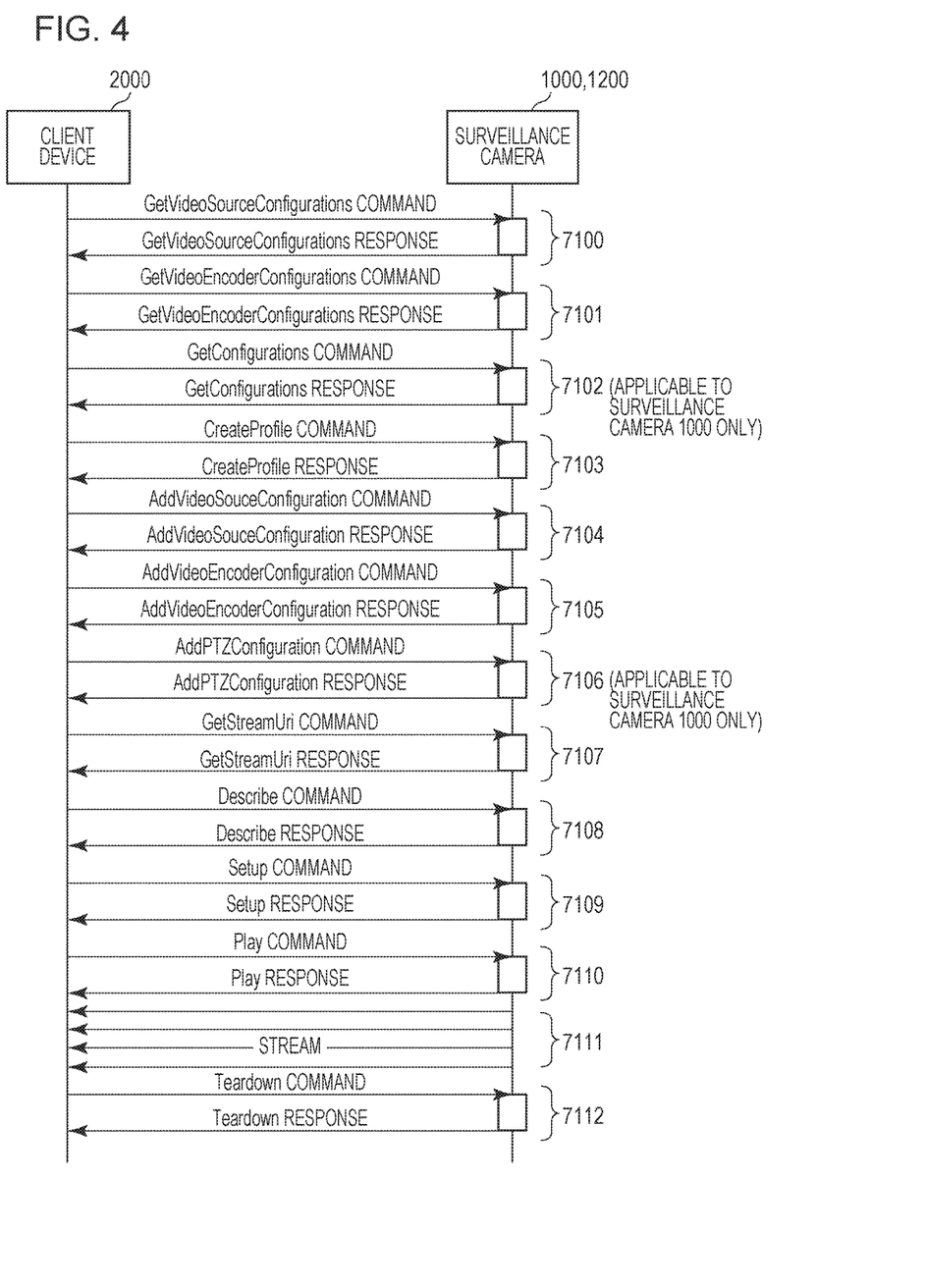
FIG. 4 illustrates a command sequence.

FIG. 4 illustrates a typical command sequence from the start of setting to the video delivery, between the surveillance camera 1000 and the client device 2000 according to the present embodiment.

Reference numeral 7100 denotes a transaction of a GetVideoSourceConfigurations command. With this command, the client device 2000 acquires a list of the VideoSourceConfiguration 6102 held by the surveillance camera 1000.

Reference numeral 7101 denotes a transaction of a GetVideoEncoderConfigurations command. With this command, the client device 2000 acquires a list of the VideoEncoderConfiguration 6103 held by the surveillance camera 1000.

Reference numeral 7102 denotes a transaction of a GetConfigurations command. With this command, the client device 2000 acquires a list of the PTZConfiguration 6104 held by the surveillance camera 1000.

Reference numeral 7103 denotes a transaction of a CreateProfile command. With this command, the client device 2000 creates a new MediaProfile 6100 in the surveillance camera 1000 and acquires its ProfileToken.

Reference numerals 7104, 7105, and 7106 denote transactions of an AddVideoSourceConfiguration command, an AdddVideoEncoderConfigurtion command, and an AddPTZConfiguration command, respectively. With these commands, the client device 2000 associates the following three, that is, a VideoSourceConfiguration, a VideoEncoderConfiguration, and a PTZConfiguration desired for a designated MediaProfile.

Reference numeral 7107 denotes a transaction of a GetStreamUri command. With this command, the client device 2000 acquires, on the basis of the configuration of the designated MediaProfile, an address (URI) to acquire a delivery stream from the surveillance camera 1000.

Reference numeral 7108 denotes a transaction of a Describe command. By executing this command using the URI acquired in 7107, the client device 2000 requests and acquires information about contents to be stream-delivered by the surveillance camera 1000.

Reference numeral 7109 denotes a transaction of a Setup command. By executing this command using the URI acquired in 7107, a method for transmitting a stream, including a session number, is shared between the client device 2000 and the surveillance camera 1000.

Reference numeral 7110 denotes a transaction of a Play command. By executing this command using the session number acquired in 7109, the client device 2000 requests the surveillance camera 1000 to start a stream. Reference numeral 7111 denotes a delivery stream. The surveillance camera 1000 delivers, with the transmission method shared in 7109, the stream that the surveillance camera 1000 has been requested to start in 7110.

Reference numeral 7112 is a transaction of a Teardown command. By executing this command using the session number acquired in 7109, the client device 2000 requests the surveillance camera 1000 to stop the stream.

Figure 5:
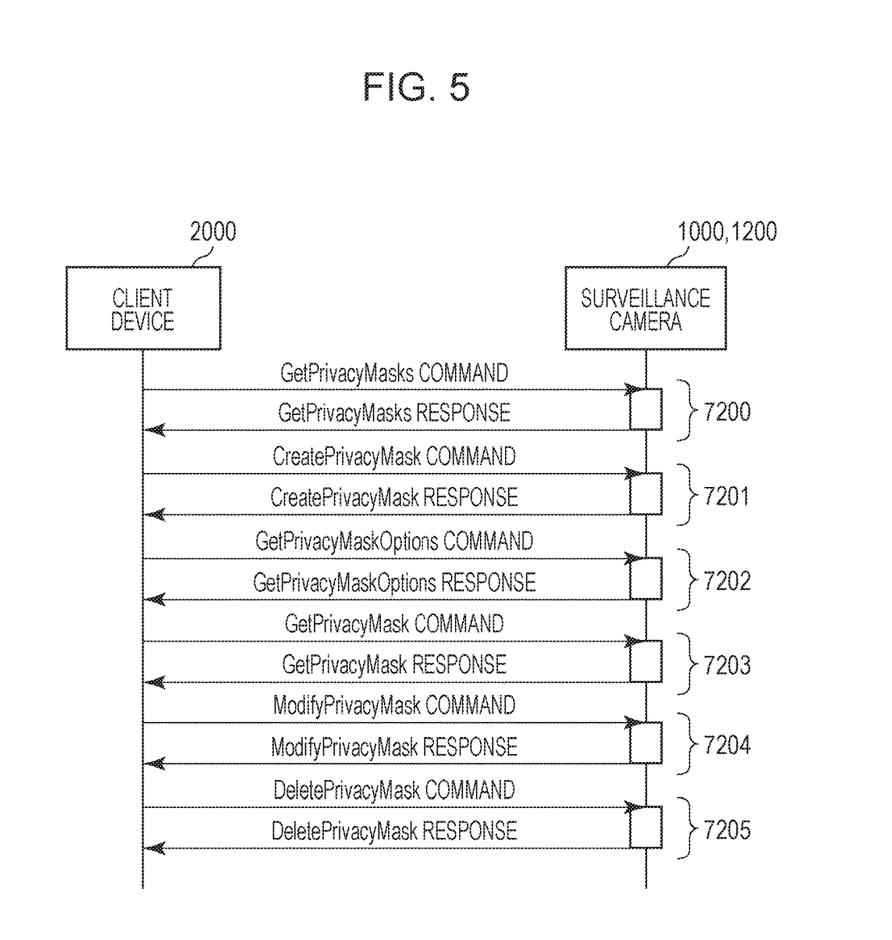
FIG. 5 illustrates a command sequence for mask setting.

FIG. 5 illustrates a typical command sequence for mask setting between the surveillance camera 1000 and the client device 2000 according to the present embodiment.

Reference numeral 7200 denotes a transaction of a GetPrivacyMasks command.

The GetPrivacyMasks command is a command used by the client device 2000 to instruct the surveillance camera 1000 to return the following PrivacyMask 6105. That is, what is returned is every PrivacyMask 6105 associated with the designated VideoSourceConfiguration 6102 illustrated in FIG. 3.

Reference numeral 7201 denotes a transaction of a CreatePrivacyMask command. The CreatePrivacyMask command is a command used by the client device 2000 to instruct the surveillance camera 1000 to create a PrivacyMask 6105. The PrivacyMask 6105 is created in association with the designated VideoSourceConfiguration 6102. By executing the CreatePrivacyMask command, the surveillance camera 1000 returns a PrivacyMaskToken of the created PrivacyMask 6105 to the client device 2000.

Reference numeral 7202 denotes a transaction of GetPrivacyMaskOptions command. The GetPrivacyMaskOptions command is a command used by the client device 2000 to instruct the surveillance camera 1000 to return a selected range or option of each parameter of the PrivacyMask 6105. Specifically, the surveillance camera 1000 is instructed to return a selected range or option of each parameter of the PrivacyMask 6105 that can be set by a ModifyPrivacyMask command described below.

Reference numeral 7203 denotes a transaction of a GetPrivacyMask command. The GetPrivacyMask command is a command that instructs a PrivacyMask 6105 having a designated PrivacyMaskToken to be returned. The PrivacyMask 6105 has the designated PrivacyMaskToken with which the client device 2000 is associated with the designated VideoSourceConfiguration 6102 of the surveillance camera 1000.

Reference numeral 7204 denotes a transaction of a ModifyPrivacyMask command. The ModifyPrivacyMask command is a command used by the client device 2000 to instruct the surveillance camera 1000 to edit each parameter included in the PrivacyMask 6105. By executing the ModifyPrivacyMask command, the surveillance camera 1000 edits the content of the PrivacyMask 6105 having the PrivacyMaskToken designated by the client device 2000. By this editing, a new mask is displayed or the currently displayed mask is changed in color, size or position. Detailed processing of this command in the surveillance camera 1000 will be specifically described later on.

Reference numeral 7205 denotes a transaction of a DeletePrivacyMask command. The DeletePrivacyMask command is a command used by the client device 2000 to instruct the surveillance camera 1000 to delete the PrivacyMask 6105 created in response to the CreatePrivacyMask command. By executing the DeletePrivacyMask command, the surveillance camera 1000 deletes the PrivacyMask 6105 having the PrivacyMaskToken designated by the client device 2000 from the storage unit.

Figure 6:
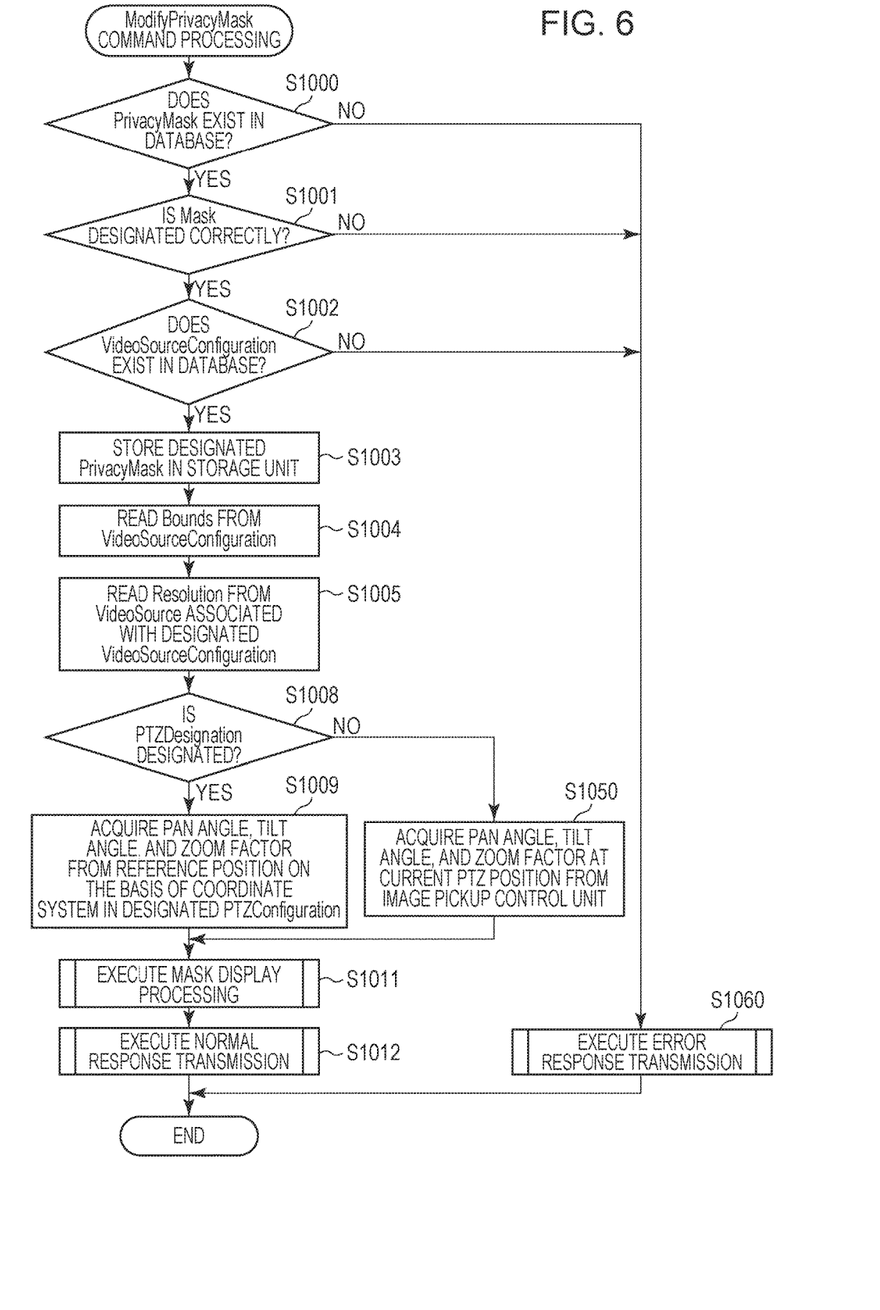
FIG. 6 is a flowchart of mask parameter processing.

FIG. 6 illustrates a processing procedure performed when the surveillance camera 1000 receives the ModifyPrivacy- Mask command from the client device 2000. This procedure represents part of a program read from the storage unit 1002 and executed by the control unit 1001, which is a computer. The storage unit 1002 is a storage medium that stores this program such that the control unit 1001, which is a computer, can read and execute the program.

In step S1000, the control unit 1001 determines whether a PrivacyMask 6105 having a PrivacyMaskToken designated by a received command exists in the storage unit 1002. If this PrivacyMask 6105 exists, the control unit 1001 advances the processing to step S1060.

In step S1001, the control unit 1001 checks whether a Mask included in the PrivacyMask 6105 is correctly set. For example, the control unit 1001 determines whether the Mask includes three or more points, and whether each point is plotted within normalized coordinate system in Bounds shown in 5002 of FIGS. 8A and 8B. If the Mask is not correctly set, the control unit 1001 advances the processing to step S1060.

In step S1002, the control unit 1001 determines whether a VideoSourceConfiguration designated in the received command exists in the storage unit 1002. If the VideoSourceConfiguration does not exist, the control unit 1001 advances the processing to step S1060.

In step S1003, the control unit 1001 causes the storage unit 1002 to store the PrivacyMask designated in the received command.

In step S1004, the control unit 1001 reads Bounds from the VideoSourceConfiguration 6102 including a VideoSourceConfigurationToken designated by the client device 2000. The VideoSourceConfigurationToken is designated by the client device 2000 memorized in the storage unit 1002. That is, the surveillance camera 1000 receives identification information (VideoSourceConfigurationToken) for identifying a video source configuration from the client device 2000.

In step S1005, the control unit 1001 reads a Resolution from the VideoSource 6101 linked to (or associated with) the VideoSourceConfiguration 6102 designated in the received command. This VideoSourceConfiguration 6102 includes the VideoSourceConfigurationToken designated in the received command.

In step S1008, the control unit 1001 determines whether a PTZDesigntion is designated or omitted in the received command. If designated, the control unit 1001 advances the processing to step S1009, whereas if omitted, the control unit 1001 advances the processing to step S1050. This PTZDesigntion is image pickup direction information indicating an image pickup direction. Therefore, in step S1008, the control unit 1001 determines whether image pickup direction information indicating an image pickup direction is included in mask parameters included in the received command.

In step S1009, the control unit 1001 reads a pan, tilt, and zoom coordinate system from the PTZConfiguration 6104 identified by the PTZConfigurationToken designated in the PTZDesignation. On the basis of this coordinate system, the control unit 1001 transforms a pan value, a tilt value, and a zoom value included in a Position designated in the PTZDesignation to a pan angle value, a tilt angle value, and a zoom factor value.

In step S1050, the control unit 1001 acquires the current pan angle value, tilt angle value, and zoom factor value from the image pickup control unit 1006.

In step S1011, the control unit 1001 executes mask display processing (the detail is omitted). The mask display processing uses the following three as arguments. Specifically, the first argument is the Bounds acquired in step S1004. The second argument is the Resolution acquired in step S1005. The third argument is a set of the pan angle value, tilt angle value, and zoom value acquired in step S1009 or step S1050, and the state of an Enabled flag included in the received command.

If YES in step S1008, the position of a mask image in an image pickup range where the image pickup unit 1003 can pick up images is identified on the basis of the following three. The first is the PTZDesigntion (image pickup direction information) included in the received mask parameters. The second is delivery image position information (position of the Bounds) associated with the VideoSourceConfigurationToken included in the received mask parameters. The third is superimposition position information (position of the mask image) included in the received mask parameters. Note that the VideoSourceConfigurationToken is identification information for identifying the delivery image position information (position of the Bounds) indicating the position of the delivery image in the picked-up image. Thus, the PTZDesignation designates the image pickup direction of the image pickup unit 1003 in relation to superimposition of the mask image on the picked-up image. As described above, when a designation of the image pickup direction is received, the position of superimposition of the mask image in the image pickup range where the image pickup unit 1003 can pick up images is set on the basis of the designated image pickup direction.

If NO in step S1008, the position of the mask image in the picked-up image is identified on the basis of the following three. The first is delivery image position information (position of the Bounds) associated with the VideoSourceConfigurationToken included in the received mask parameters. The second is superimposition position information (position of the mask image) included in the received mask parameters. The third is the current image pickup direction of the image pickup apparatus acquired from the image pickup control unit 1006 in step S1050. As described above, when a designation of the image pickup direction of the image pickup unit 1003 is not received in relation to superimposition of the mask image, the control unit 1001 sets the position of superimposition of the mask image in the image pickup range where the image pickup unit 1003 can pick up images, on the basis of the image pickup direction identified by the image pickup control unit 1006.

In the mask display processing, the control unit 1001 inputs the arguments received in step S1011 into the mask processing unit 1007. As will be described with reference to FIGS. 8A and 8B and FIG. 9, the mask processing unit 1007 uniquely identifies the mask position in an image pickup field of view on the basis of the input data, and applies a mask to the image being delivered on the basis of the designation of the Enabled flag. The detail of this processing will be described later on.

In step S1012, the control unit 1001 executes normal response transmission (the detail is omitted). In the normal response transmission, the control unit 1001 transmits a normal response to the received command via the communication unit 1004 to the client device 2000.

In step S1060, the control unit 1001 executes error response transmission (the detail is omitted). In the error response transmission, the control unit 1001 transmits an error response to the received command via the communication unit 1004 to the client device 2000.

Figure 8A:
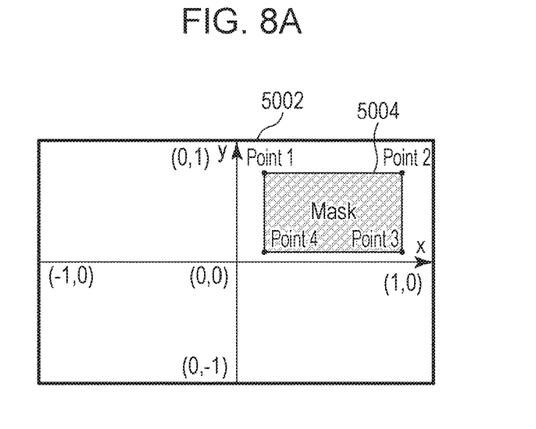
FIGS. 8A and 8B illustrate a coordinate calculation.
Figure 8B:
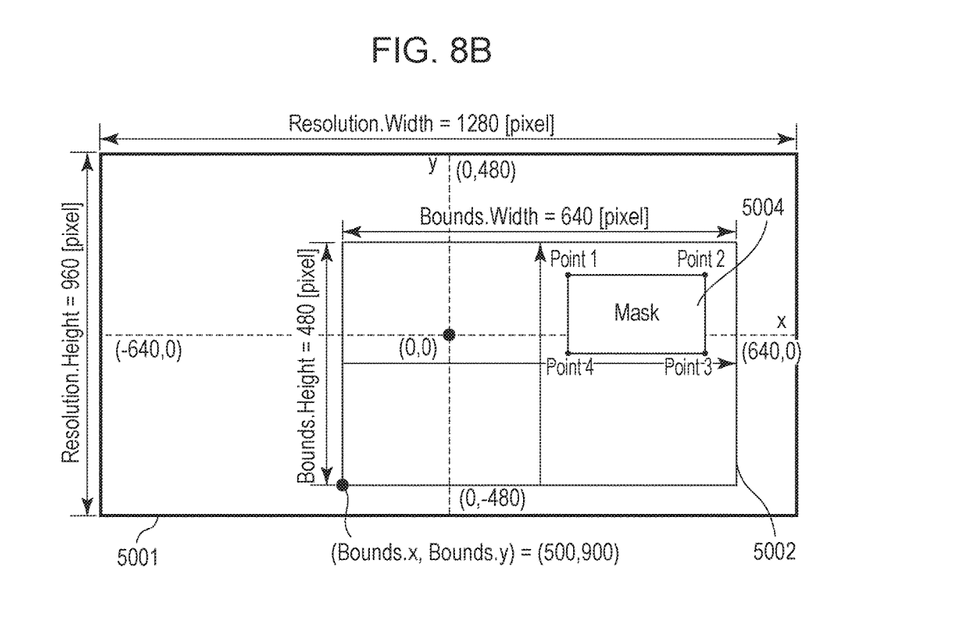
Figure 9:
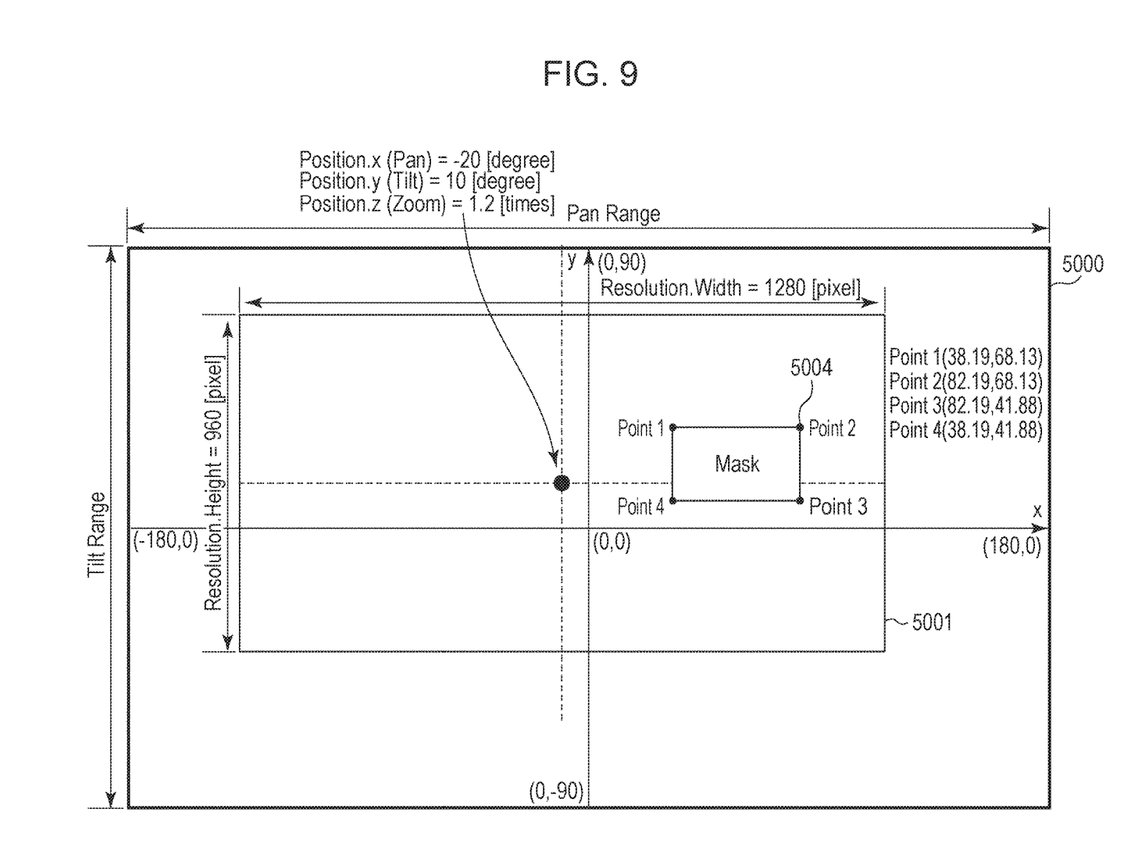
FIG. 9 illustrates a coordinate calculation.

FIGS. 8A and 8B and FIG. 9 illustrate a method for identifying coordinates of a mask. The operation in step S1011 will be described with reference to FIGS. 8A and 8B and FIG. 9.

FIG. 8A illustrates a method for designating coordinates of a Mask in a PrivacyMask. The Mask is designated with three or more points plotted in a normalized coordinate system within a delivery image 5002 cut out using Bounds from image data output by the VideoSource 6101. These points are plotted in the normalized coordinate system where values in both the horizontal direction (x) and the vertical direction (y) are normalized to the range of −1.0 to +1.0, with the rightward and upward directions each defined as a positive direction. For example, a Mask 5004 in FIG. 8A is designated with points 1 to 4 at (x,y)=(0.2,0.8), (0.8,0.8), (0.2,0.1), and (0.8,0.1).

FIG. 8B illustrates image data 5001 output from the VideoSource 6101, and the Mask 5004 superimposed on the image data 5001, the Mask 5004 being described with reference to FIG. 8A. For example, assume that Resolution.Height is 960 pixels and Resolution.Width is 1280 pixels. Also assume that Bounds.Height is 480 pixels and Bounds.Width is 640 pixels, and that Bounds.x is 500 pixels and Bounds.y is 900 pixels. In this case, to calculate the position (x2,y2) of each point of the Mask 5004 in a Resolution pixel coordinate system where the center point of the image data 5001 is the origin, computational expressions to be used are as follows.

$$Mask.x2=((Bounds.x-Resolution.Width/2)+Bounds.Width/2)+Bounds.Width/2*Mask.x$$

$$Mask.y2=((Bounds.y-Resolution.Height/2)-Bounds.Height/2)+Bounds.Height/2*Mask.y$$

In the case of an image pickup apparatus that does not support the function of cutting out a delivery image from image data, the equation, Bounds=Resolution, is true and the computational expressions described above can be expressed as follows.

$$Mask.x2=Resolution.Width/2*Mask.x$$

$$Mask.y2=Resolution.Height/2*Mask.y$$

For example, the Mask 5004 in FIG. 8B is expressed with four points at (x2,y2)=(244,372), (436,372), (436,204), and (244,204).

FIG. 9 illustrates the entire range 5000 where the image pickup unit 1003 can pick up images, and the image data 5001 superimposed on the entire range 5000 on the basis of the orientation in the image pickup direction (pan=x, tilt=y) and the zoom factor (z) designated in the Position, the image data 5001 being illustrated in FIG. 8B. The orientation in the image pickup direction (x,y) indicates the center point of the image data 5001. A coordinate system included in the PTZConfiguration is used as a Position coordinate system. In the present example, the coordinate system includes angle coordinates having a pan range x=−180 to +180 (degrees) and a tilt range y=−90 to +90 (degrees), and a magnification coordinate having a zoom z=1 to 100 (times). For example, assume that Position.x=−20 (degrees), Position.y=+10 (degrees), and Position.z=1.2 (times). In this case, to calculate the position (x3,y3) of each point of the Mask 5004 in the coordinate system shown in the PTZConfiguration, with the center point of the entire range 5000 where the image pickup unit 1003 can pick up images as the origin, computational expressions to be used are as follows.

$$Mask.x3=Position.x+Mask.x2/Resolution.Width/2/Position.Zoom*pan\ angle\ transformation\ coefficient$$

$$Mask.y3=Position.y+Mask.y2/Resolution.Height/2/Position.Zoom*tilt\ angle\ transformation\ coefficient$$

A zoom and pan angle transformation coefficient and a zoom and tilt angle transformation coefficient are coefficients for transforming x and y positions of the mask in the image data into pan and tilt angle coordinates, the coefficients being based on the characteristics of the image pickup unit 1003. In the present example, the zoom and pan angle transformation coefficient and the zoom and tilt angle transformation coefficient are 90 and 180, respectively. The Mask 5004 in FIG. 9 is expressed with four points at (x3,y3)=(38.19,68.13), (82.19,68.13), (82.19,41.88), and (38.19, 41.88).

A flow of calculation has been described with reference to FIGS. 8A and 8B and FIG. 9. The mask position (x,y) designated by coordinates in the delivery image cut out using Bounds can be transformed into the position (x3,y3) designated by coordinates in the image pickup field of view of the image pickup apparatus. This transformation is performed on the basis of information of the Bounds, Resolution, and Position. That is, the surveillance camera 1000 can uniquely identify the mask position in the image pickup field of view. On the basis of the video source configuration identified by received identification information and the identified image pickup direction, the control unit 1001 sets the position of superimposition of the mask image in the image pickup range where the image pickup unit 1003 can pick up images.

With the mask setting processing of the present embodiment described above, the following effects can be achieved. In the present embodiment, the client can designate the image pickup direction (e.g., pan and tilt positions) of the camera in relation to the mask setting. Thus, when setting a capturing prohibited area for each of picked-up images obtained in different image pickup directions, the client can designate a mask position without actually changing the image pickup direction of the camera. Therefore, it is possible to simultaneously perform processing for setting capturing prohibited areas for respective picked-up images obtained in different image pickup directions.

The surveillance camera 1000 can uniquely identify the mask position set by the client device, regardless of having the function of cutting out, using Bounds, a specific part of image data generated by the image pickup unit 1003 and delivering the resulting image. Thus, the image pickup apparatus can allow the client device to set a common mask processing function regardless of whether Bounds are supported.

Second Embodiment

In the first embodiment, an embodiment of the present invention has been described by referring to a surveillance camera in which a PrivacyMask, which is a parameter for a mask processing function, is associated with a VideoSourceConfiguration and held.

In the first embodiment, a surveillance camera has been described as an example, which is capable of changing the image pickup range of the image pickup unit by varying the pan, tilt, or zoom. However, the present invention is not limited to this. The present invention is also applicable to a surveillance camera not having the pan, tilt, and zoom.

A second embodiment of the present invention that takes the above into account will now be described. Note that the description of the same parts as those of the first embodiment will be omitted.

FIG. 1B illustrates a surveillance camera 1200 according to the second embodiment.

Figure 2B:
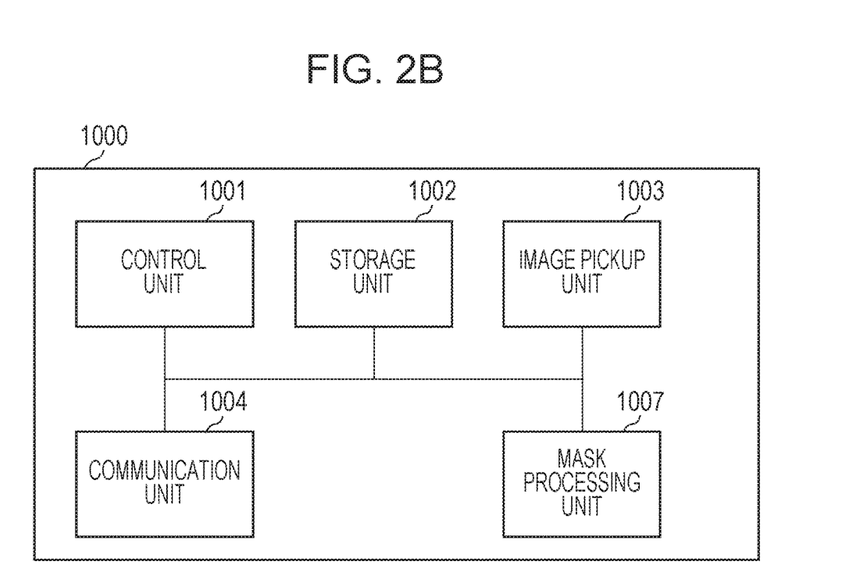

FIG. 2B illustrates an internal configuration of the surveillance camera 1200.

FIG. 4 illustrates a typical command sequence from the start of setting to the video delivery, between the surveillance camera 1200 and the client device 2000 according to the present embodiment.

Figure 7:
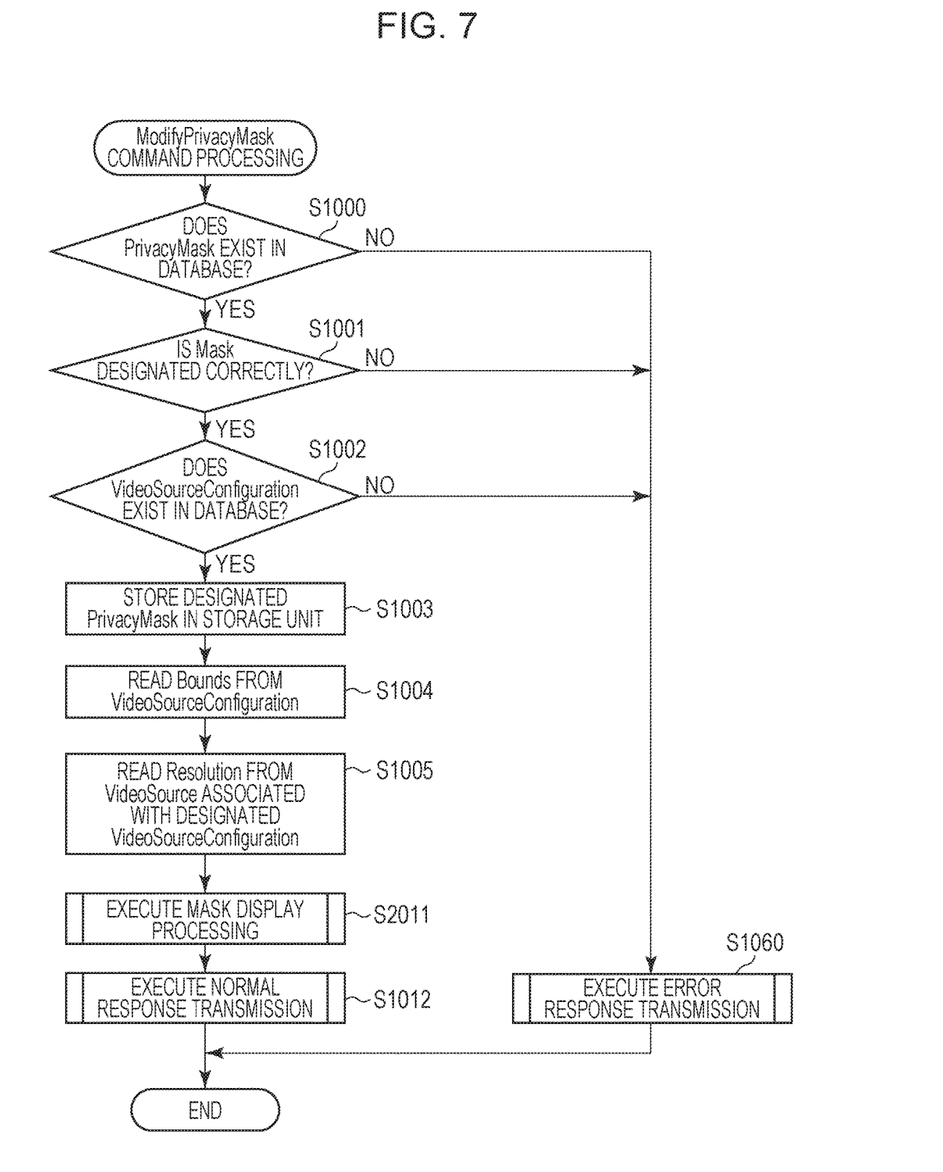
FIG. 7 is a flowchart of mask parameter processing.

FIG. 7 illustrates processing performed when the surveillance camera 1200 receives the ModifyPrivacyMask command described above from the client device 2000.

In step S2011, the control unit 1001 executes mask display processing by using the Bounds acquired in step S1004, the Resolution acquired in step S1005, and the state of the Enabled flag included in the received command as arguments. The detail of the mask display processing will be omitted.

In the mask display processing, the control unit 1001 inputs the arguments received in step S2011 into the mask processing unit 1007. As described with reference to FIGS. 8A and 8B and FIG. 9, the mask processing unit 1007 uniquely identifies the mask position in the image pickup field of view on the basis of the input data, and applies a mask to the image being delivered on the basis of the designation of the Enabled flag.

The operation in step S2011 will be described with reference to FIGS. 8A and 8B.

Since the surveillance camera 1200 cannot change the image pickup range of the image pickup unit 1003, the image data 5001 in FIG. 8B is equivalent to the image pickup field of view. Therefore, by the flow of calculation described with reference to FIGS. 8A and 8B, the mask position (x,y) designated by coordinates in the delivery image cut out using the Bounds can be transformed into the position (x2,y2) designated by coordinates in the image pickup field of view of the image pickup apparatus. This transformation is performed on the basis of information of the Bounds and Resolution. That is, the surveillance camera 1200 can uniquely identify the mask position in the image pickup field of view. Specifically, when the image pickup unit 1003 does not have the function of changing the image pickup direction, the position of the mask image in the image pickup range where the image pickup unit 1003 can pick up images is identified on the basis of the following two. The first is delivery image position information (position of the Bounds) associated with the VideoSourceConfigurationToken included in the received mask parameters. The second is superimposition position information (position of the mask image) included in the received mask parameters. Note that the VideoSourceConfigurationToken is identification information for identifying the delivery image position information (position of the Bounds) indicating the position of the delivery image in the picked-up image.

With the mask setting processing of the present embodiment described above, the surveillance camera can have a common mask processing function regardless of whether it has the function of changing the image pickup range of the image pickup unit 1003 including the pan, tilt, and zoom. Thus, regardless of whether the PTZConfiguration and the PTZDesignation including the Position are supported, the image pickup apparatus is capable of allowing the client device to set a common mask processing function.

Although the operations of the surveillance cameras that implement the present invention have been described in the first and second embodiments, the embodiments are not necessarily limited to those described above and may be partially changed as follows.

(1) The surveillance camera 1000 according to one of the embodiments uses angle coordinates for a pan and a tilt, and also uses a magnification coordinate as a zoom coordinate in the PTZConfiguration. Alternatively, for example, normalized coordinates may be used, in which the entire range is normalized to the range of −1.0 to +1.0.

(2) The change of the image pickup direction in the image pickup apparatus of each embodiment has been described by using a platform device or the like as an example. Alternatively, a so-called electronic PTZ may be used, which is realized by electronically cutting out a part of the picked-up image.

(3) The computational expressions for uniquely identifying a mask position have been described with reference to FIGS. 8A and 8B and FIG. 9. However, the method for identifying a mask position varies depending on the algorithm or specifications of the mask processing unit 1007 of each model. The type of information necessary to identify a mask position or a computational method for identification does not necessarily have to be those described in the embodiments.

Other Embodiments

Embodiments of the present invention may be realized by a computer of a system or apparatus that reads out and executes computer-executable instructions recorded on a recording medium (e.g., computer-readable non-transitory storage device). The functions of one or more of the above-described embodiments of the present invention are realized when the computer executes the instructions.

Embodiments of the present invention may be realized by a method executed by the computer of the system or apparatus. For example, the functions of one or more of the above-described embodiments of the present invention are realized when the computer reads out the computer-executable instructions from the recording medium.

The computer may include one or more central processing units (CPUs), micro processing units (MPUs), or other circuits. The computer may include a network of separate computers or separate computer processors.

The computer-executable instructions are provided to the computer, for example, via a network or from a recording medium. Examples of the recording medium include one or more hard disks, random access memories (RAMs), read only memories (ROMs), storages of distributed computing systems, optical disks (such as compact discs (CDs), digital versatile discs (DVDs), or Blu-ray Discs (BDs) (registered trademark)), flash memories, and memory cards.

The present invention can ease the complicated process of designating a coordinate position of a mask image in a client.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image pickup apparatus comprising:
an image pickup unit capable of changing an image pickup direction to pick up an image;

a memory to hold a plurality of video source configurations including a resolution of the picked-up image; and
circuitry configured to:
receive identification information for identifying a video source configuration and a mask position for setting a mask image to be displayed within the picked-up image; and
set the mask position of the mask image to be displayed on the picked-up image on the basis of the video source configuration identified by the received identification information, the mask position of the mask image being set relative to a current image pickup direction of the image pickup unit.

2. The image pickup apparatus according to claim 1, wherein the current image pickup direction is defined based on at least one of a pan angle value, a tilt angle value, and a zoom factor value.

3. The image pickup apparatus according to claim 1, wherein the received mask position is defined based on a coordinate of the mask image in a normalized coordinate system.

4. An image pickup method of an image pickup apparatus capable of changing an image pickup direction to pick up an image, comprising:
receiving identification information for identifying a video source configuration including a resolution of the picked-up image, wherein a plurality of video source configurations are stored in a memory of the image pickup apparatus, and
receiving a mask position for setting a mask image to be displayed within the picked-up image; and
setting the mask position of the mask image to be displayed on the picked-up image on the basis of the video source configuration identified by the received identification information, the mask position of the mask image being set relative to a current image pickup direction of the image pickup unit.

5. The method according to claim 4, wherein the current image pickup direction is defined based on at least one of a pan angle value, a tilt angle value, and a zoom factor value.

6. The method according to claim 4, wherein the received mask position is defined based on a coordinate of the mask image in a normalized coordinate system.

7. A non-transitory computer readable medium comprising a computer program for an image pickup method of an image pickup apparatus capable of changing an image pickup direction to pick up an image, the method comprising:
receiving identification information for identifying a video source configuration including a resolution of the picked-up image, wherein a plurality of video source configurations are stored in a memory of the image pickup apparatus, and
receiving a mask position for setting a mask image to be displayed within the picked-up image; and
setting the mask position of the mask image to be displayed on the picked-up image on the basis of the video source configuration identified by the received identification information, the mask position of the mask image being set relative to a current image pickup direction of the image pickup unit.

8. The non-transitory computer readable medium according to claim 7, wherein the current image pickup direction is defined based on at least one of a pan angle value, a tilt angle value, and a zoom factor value.

9. The non-transitory computer readable medium according to claim 7, wherein the received mask position is defined based on a coordinate of the mask image in a normalized coordinate system.

* * * * *